(12) United States Patent
Ewert

(10) Patent No.: US 6,523,949 B1
(45) Date of Patent: Feb. 25, 2003

(54) VARIABLE IMAGE PRINTING USING INKJET PRINTER

(76) Inventor: Brian C. Ewert, 9608 Windy Gap Rd., Charlotte, NC (US) 28208

( * ) Notice: Subject to any disclaimer, the term of this patent is extended or adjusted under 35 U.S.C. 154(b) by 0 days.

(21) Appl. No.: 09/510,691

(22) Filed: Feb. 23, 2000

Related U.S. Application Data

(60) Provisional application No. 60/123,436, filed on Mar. 9, 1999.

(51) Int. Cl.⁷ .............................. B41J 2/01; C09K 19/00
(52) U.S. Cl. ....................................... 347/105; 428/1.6
(58) Field of Search ............................ 347/88, 99, 102, 347/104, 105; 346/136; 428/1.5, 1.55, 1.6; 399/319, 320, 336

(56) References Cited

U.S. PATENT DOCUMENTS

| | | | | |
|---|---|---|---|---|
| 3,874,091 A | * | 4/1975 | Fukumoto | 34/66 |
| 4,490,731 A | * | 12/1984 | Vaught | 347/88 |
| 4,707,211 A | | 11/1987 | Shibata | 156/354 |
| 4,784,714 A | | 11/1988 | Shibata | 156/354 |
| 5,086,209 A | * | 2/1992 | Kintz et al. | 219/216 |
| 5,270,730 A | * | 12/1993 | Yaegashi et al. | 347/56 |
| 5,431,763 A | | 7/1995 | Bradshaw | 156/256 |
| 5,480,240 A | * | 1/1996 | Bolash et al. | 400/124.01 |
| 5,487,337 A | | 1/1996 | Uland | 101/284 |
| 5,497,701 A | | 3/1996 | Uland | 101/288 |
| 5,520,766 A | * | 5/1996 | Iwasaki | 156/277 |
| 5,646,653 A | * | 7/1997 | Fujioka et al. | 347/8 |
| 5,658,647 A | | 8/1997 | Magill et al. | 428/195 |
| 5,674,345 A | | 10/1997 | Nash | 156/264 |
| 5,999,204 A | * | 12/1999 | Kojima | 347/194 |
| 6,007,193 A | * | 12/1999 | Kashimura et al. | 347/92 |
| 6,049,347 A | * | 4/2000 | Ewert et al. | 347/215 |
| 6,113,231 A | * | 9/2000 | Burr et al. | 347/103 |

FOREIGN PATENT DOCUMENTS

JP   06255202 A   *   9/1994   ............ B41J/27/10

* cited by examiner

Primary Examiner—Huan Tran
Assistant Examiner—Alfred Dudding
(74) Attorney, Agent, or Firm—Christopher C. Dremann

(57) ABSTRACT

An inkjet printer prints variable image identifying information on a substrate with a first side having a release agent thereon and a second side having an activated chemical adhesive thereon. The inkjet printer includes at least one inkjet head for transferring an ink to the first side of the substrate and a pair of opposed guide rollers, a nip roller assembly and a driven platen roller opposite the inkjet head for advancing the substrate past the inkjet head. The inkjet printer further includes a fuser for drying the ink immediately after the variable identifying information is printed on the substrate. Preferably, the variable identifying information is printed on the substrate at a rate that is compatible with the operating speed of a tape applicator on a conventional high-speed production line.

16 Claims, 6 Drawing Sheets

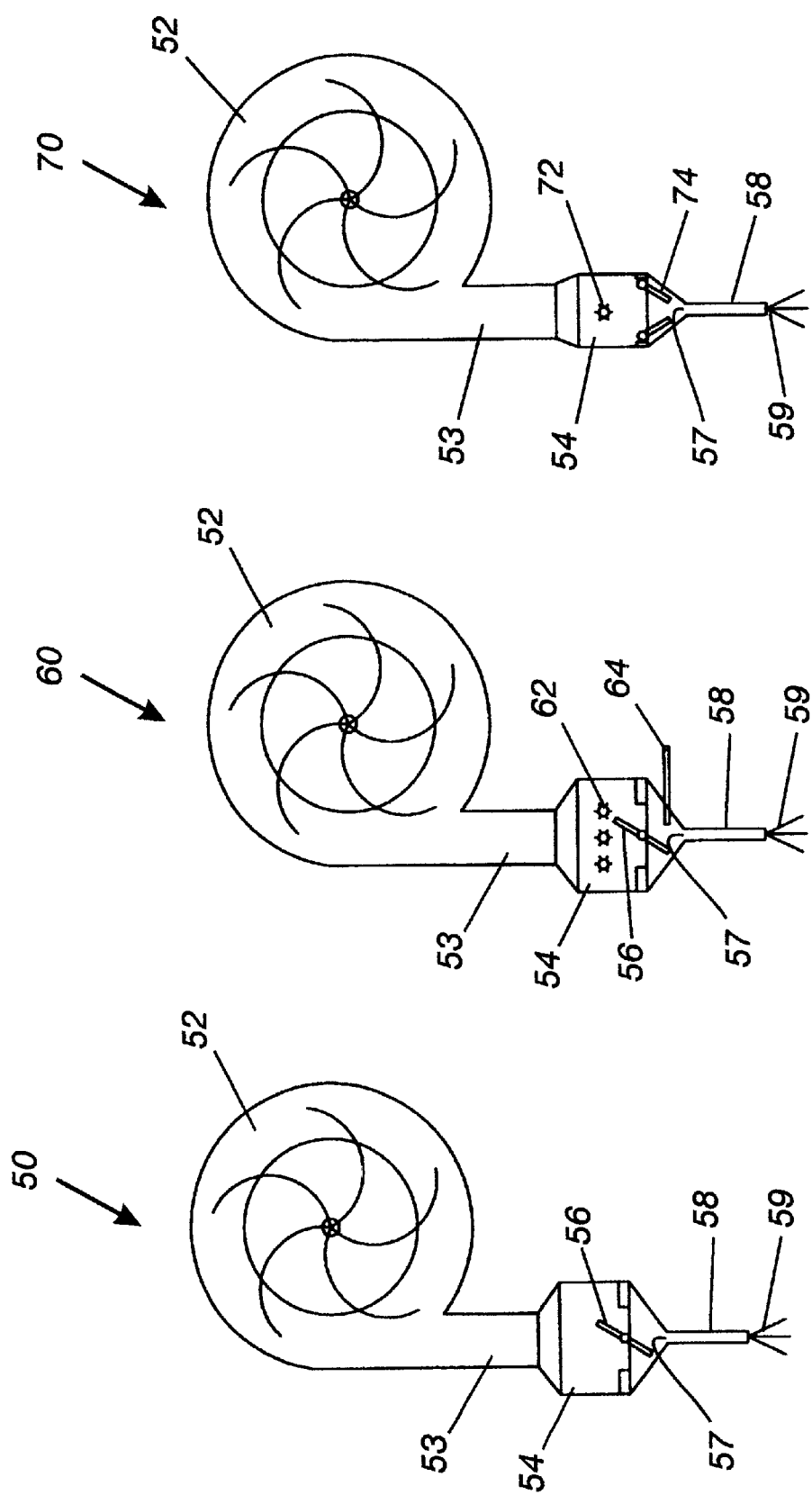

*Fig.10*
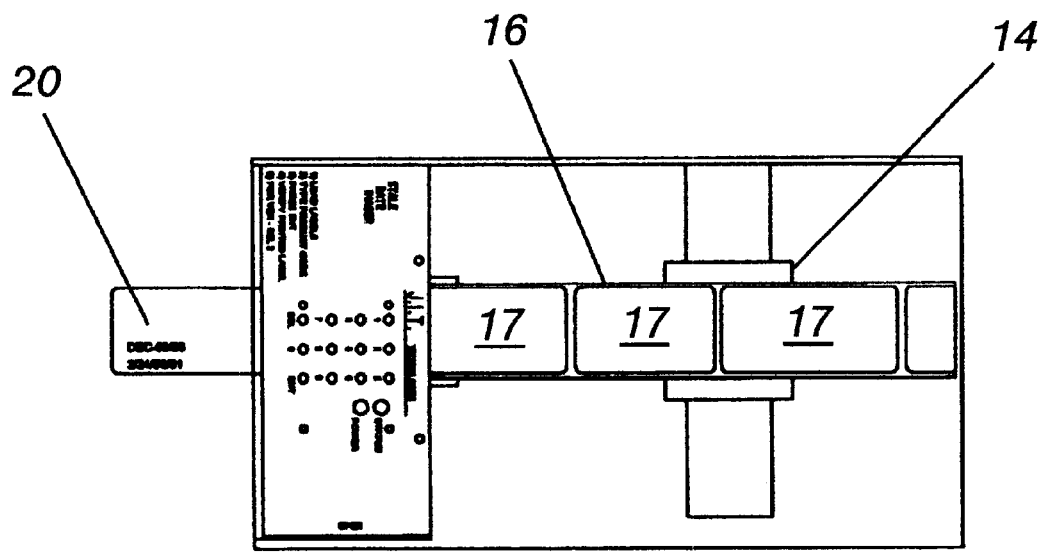
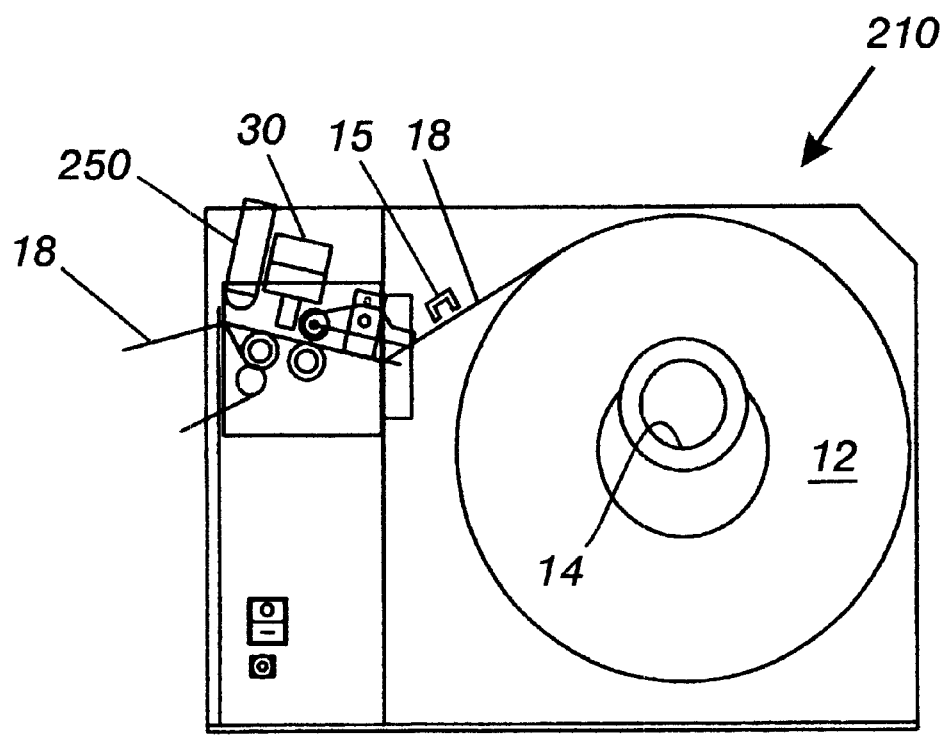
*Fig.9*

VARIABLE IMAGE PRINTING USING INKJET PRINTER

CROSS REFERENCE TO RELATED APPLICATION

This application claims the benefit of the filing date of U.S. Provisional Patent Application Serial No. 60/123,436 filed Mar. 9, 1999, the disclosure of which is incorporated herein.

FIELD OF THE INVENTION

The invention relates generally to an apparatus for variable image printing. More particularly, the invention relates to an inkjet printer for printing variable identifying information on plain paper label stock, linerless label stock and tape to be applied to the outside of a container, such as a cardboard box or carton.

BACKGROUND OF THE INVENTION

Manufacturers of products who ship their goods in a container, such as a cardboard box or carton, referred to herein as a case, often desire to apply a label to the outside of the case. The label typically has identifying information, such as product codes, stock or lot numbers, bar codes and shipping data, printed thereon to identify the manufacturer of the goods, the contents of the case or the destination of the case. The label has a first side, referred to herein as the face, on which the identifying information is printed and a second side opposite the face which is coated with a pressure sensitive adhesive. The adhesive side of the label is applied to the outside of the case so that the identifying information on the face of the label is available to be read either manually or by an electronic scanner.

If the identifying information for two or more successive cases is the same, it can be pre-printed on the label, for example, by a flexo-graphic printing process, and applied to the outside of the case by a conventional label applicator. Often, however, the identifying information for successive cases varies so that the manufacturer, the contents, or the destination of a single case or a series of cases can be readily identified. The process of printing variable identifying information on a label or on a series of labels is known as variable image printing. The present practice is to print the variable identifying information on plain paper label stock using a direct contact printer immediately before the label is applied to the case. As used herein, the term plain paper label stock refers to labels having a plain paper surface on one side and an activated chemical adhesive surface on the other side that is protected by a liner coated with a release film which must be removed before the label is applied to the case.

Plain paper label stock, linerless label stock and tape can be manufactured in a continuous roll and wound onto a spool mounted on an unwind spool spindle driven by a conventional motor. Plain paper label stock, however, is expensive relative to linerless label stock and tape. In addition, plain paper label stock requires specially designed equipment to remove the liner before the label is applied to the case. Plain paper label stock is typically applied to the case by a tamp head positioned on the end of a pneumatic or hydraulic tamp. The plain paper label stock is held on the face of the tamp by a vacuum created behind the tamp head and is transferred to the case by activating an air jet in the direction of the case. The liner of the plain paper label stock, however, must be removed before the label is transferred to the case. Further, the equipment required to position the plain paper label stock on the tamp head and to transfer the label to the case is susceptible to misfeeding and malfunctioning. Thus, the cost of variable image printing on plain paper label stock and the additional equipment required to remove the liner and apply the label to a case decreases the productivity and increases the complexity of the labeling process.

The same manufacturers often utilize automated production lines to package, seal and label cases. A typical production line includes a sealing station where the case is sealed with an adhesive sealing tape and a separate labeling station where a plain paper stock label is applied to the case. If variable identifying information is to be printed on the label, the labeling station includes a variable image printer. It has long been recognized that combining the sealing and labeling stations would result in increased productivity, and thus increase profitability. However, the full advantages of a combined sealing and labeling station cannot be realized unless the station is capable of printing variable identifying information onto a label and sealing the case with the label at the same speed or faster than the speed of the production line, which is between about 8 and about 24 inches per second, and preferably is at least about 16 inches per second. Direct contact variable image printers, and in particular thermal transfer printers, are limited to operating speeds of less than about 12 inches per second at a resolution of about 300 dots per inch or less.

As a result, manufacturers presently combine the tasks of sealing and labeling a case only when the information to be printed on the labels is constant. This is accomplished by utilizing a continuous roll of linerless label stock or adhesive sealing tape having the identifying information preprinted on the face of the linerless label stock or tape. Until now, the difficulties that manufacturers have had to overcome to simultaneously seal and label a case when variable identifying information is to be printed on the linerless label stock or tape have proven insurmountable. The primary difficulty is that the adhesive side of the linerless label stock or tape must be supported against the pressure of the print head as the ink is transferred to the face of the label or tape. As a result, the adhesive side of the linerless label stock or tape adheres to the supporting structure, typically one or more platen rollers, or the adhesive accumulates on the exterior surfaces of the supporting structure. Another difficulty is that conventional ink formulations do not adequately adhere to the release agent on the face of the linerless label stock or tape. A further difficulty is that the linerless label stock or tape must be printed and applied at a rate that is compatible with a conventional high-speed production line.

The adhesive side of the linerless label stock or tape can be supported against the pressure of the print head by a platen roller having a TEFLON®, silicon or plasma exterior surface, or that is itself coated with a suitable release film. The linerless label stock and tape currently utilized for sealing cases, however, typically have an exceptionally strong adhesive to insure that the case does not break open during handling. Over time, the adhesive accumulates on the platen roller or strips the TEFLON®, silicon, plasma or release film from the exterior surface of the platen roller. If either instance occurs, the case will likely be inadequately sealed. Thus, the condition of the platen roller and the adhesive on the linerless label stock or tape must be monitored closely. The platen roller must be replaced or the coating must be reapplied at regular intervals, thereby decreasing productivity and increasing the maintenance required to operate the combined sealing and labeling station on the production line.

A dry chemical adhesive that must be wetted to activate the adhesive could be used, and the linerless label stock or tape could be printed with the variable identifying information just before the adhesive is wetted. The platen roller would then support only the dry adhesive side of the linerless label stock or tape against the pressure of the print head while the variable identifying information is printed. A dry adhesive that requires wetting immediately prior to application, however, typically does not produce an adhesive bond that is adequate to insure that the case remains closed during normal handling and shipping conditions. Further, the use of a dry chemical adhesive requires the introduction of an additional mechanism to activate the adhesive. Any such additional mechanism increases the complexity of the sealing and labeling station, thereby decreasing productivity and increasing the maintenance required to operate the combined sealing and labeling station on the production line.

The assignee of the present invention has previously developed a unique thermal transfer printer for variable image printing on a continuous roll of linerless label stock and tape. The thermal transfer printer includes a captive tape guide that supports the adhesive side of the linerless label stock or tape against the pressure of the print head while minimizing the amount of adhesive that accumulates on the platen roller. The thermal transfer printer further utilizes a unique ink formulation that adheres to the release agent on the face of the linerless label stock or tape or to the underlying substrate. The thermal transfer printer, however, is limited in operating speed to about 12 inches per second at a resolution of about 300 dots per inch. Accordingly, the thermal transfer printer cannot print variable identifying information at a rate that is compatible with the operating speed of a conventional high-speed production line. As a result, productivity is sacrificed when the thermal transfer printer is utilized in connection with a combined sealing and labeling station on a conventional high-speed production line.

As is thus apparent, there is an acute need for an apparatus for printing variable identifying information on plain paper label stock, linerless label stock and tape at a speed approaching the operating speed of a conventional high-speed production line. More specifically, there is a need for an apparatus for printing variable identifying information on plain paper label stock, linerless label stock and tape that is to be applied to a case to convey identifying information, such as product codes, stock or lot numbers, bar codes and shipping data, to identify the manufacturer of the goods, the contents of the case or the destination of the case. In particular, a combined sealing and labeling station is needed that is capable of printing variable identifying information on adhesive sealing tape at a speed approaching the operating speed of a conventional high-speed production line. Such a combined sealing and labeling station would make it possible to combine the tasks of sealing and labeling a case on a conventional high-speed production line without decreasing productivity or increasing the complexity or the maintenance of the sealing and labeling station.

Accordingly, it is a principle object of the invention to provide an apparatus for printing variable identifying information on plain paper label stock, linerless label stock and tape at a speed greater than about 12 inches per second at a print resolution of at least about 300 dots per inch. More particularly, it is an object of the invention to provide an apparatus for printing variable identifying information, such as product codes, stock or lot numbers, bar codes and shipping data, on plain paper label stock, linerless label stock and tape that is to be applied to a case to identify the manufacturer of the goods, the contents of the case or the destination of the case.

It is yet another object of the invention to provide a combined sealing and labeling station including an apparatus for sealing and labeling a case on a conventional high-speed production line that is capable of printing variable identifying information on the face of adhesive sealing tape at a speed greater than about 12 inches per second at a print resolution of at least about 300 dots per inch.

It is yet a further object of the invention to provide a combined sealing and labeling station including an apparatus for sealing and labeling a case on a conventional high-speed production line with adhesive sealing tape having variable identifying information printed thereon without decreasing productivity or increasing the complexity and maintenance of the sealing and labeling station.

SUMMARY OF THE INVENTION

The invention is an apparatus for printing variable identifying information, such as the contents of a container, the manufacturer of the contents or the destination of the case, on a thin, relatively narrow, continuous roll of plain paper label stock, linerless label stock or tape. The plain paper label stock, linerless label stock or tape has a first side and a second side. Preferably, the first side of the tape has a release agent thereon and the second side has an activated chemical adhesive thereon. The apparatus includes an inkjet printer for printing variable identifying information on the first side of the tape. The inkjet printer includes an unwind spool spindle and an unwind spool for supporting the continuous roll of the plain paper label stock, linerless label stock or tape. The unwind spool is rotatably mounted on the unwind spool spindle so that the continuous roll of plain paper label stock, linerless label stock or tape may be unwound from the spool on demand. The inkjet printer also includes at least one inkjet print head for applying ink to the first side of the plain paper label stock, linerless label stock or tape. The inkjet printer further includes guide and roller means for guiding the plain paper label stock, linerless label stock or tape past the inkjet print head and means for advancing the plain paper label stock, linerless label stock or tape on demand. Preferably, the inkjet printer prints the variable identifying information on the plain paper label stock, linerless label stock or tape at a rate that is compatible with the operating speed of a tape applicator on a conventional high-speed production line.

The guide and roller means for guiding the plain paper label stock, linerless label stock or tape past the inkjet print head includes a pair of opposed guide rollers, a nip roller assembly and a driven platen roller opposite the inkjet print head. The pair of opposed guide rollers includes an upper guide roller and a lower guide roller. The nip roller assembly includes a driven feed roller and a stationary nip roller opposite the driven feed roller. The means for advancing the plain paper label stock, linerless label stock or tape on demand includes a direct current (DC) servo motor mechanically connected to the driven feed roller and the driven platen roller. The servo motor includes a drive shaft that simultaneously drives the driven feed roller and the driven platen roller to advance the plain paper label stock, linerless label stock or tape past the inkjet print head. The lower guide roller, the driven feed roller and the driven platen roller support the adhesive side of the linerless label stock or tape while maintaining consistent alignment of the face of the linerless label stock or tape opposite the inkjet print head. The opposed guide rollers, the driven feed roller and the driven platen roller each have an exterior surface coating thereon that prevents the activated chemical adhesive from accumulating on the rollers.

Preferably, the ink is a unique formulation of resin and wax in which the resin is specially engineered to print on the release agent on the face of the linerless label stock or tape and the wax is specially engineered to adhere the print to the release agent on the face of the tape. Thus, the uniquely formulated ink optimizes the adherence, bleed resistance, visibility, flexibility and utility requirements for printing the variable identifying information on the face of the tape. In one of the preferred embodiments, the inkjet printer further includes a melt tank for melting solid blocks of ink and one or more conventional heating elements positioned within the melt tank. A thermocouple monitors the temperature of the melted ink within the melt tank. The melted ink is delivered to the inkjet print head by an ink pump that is in fluid communication with the melt tank through a heated conduit.

The inkjet printer further includes a fuser for drying the ink immediately after the variable identifying information is printed on the tape. In one preferred embodiment, the fuser includes a blower unit that generates a stream of ambient air. The blower unit is in fluid communication with a pneumatic chamber through an exhaust port. The pneumatic chamber is connected to a nozzle that has a truncated, conical entrance port and a small diameter, cylindrical exit port for directing the stream of air onto the first side of the tape. A butterfly valve is positioned between the pneumatic chamber and the entrance port of the nozzle for varying the amount of air that is permitted to enter and subsequently exit the nozzle. In another preferred embodiment, the fuser may further include a heating coil consisting of one or more conventional heating elements positioned within the pneumatic chamber for heating the ambient air. A thermocouple may also be provided to monitor the temperature of the heated air inside the pneumatic chamber. In another preferred embodiment, an ultraviolet light bulb is positioned within the pneumatic chamber and at least one light shutter is positioned between the pneumatic chamber and the entrance port of the nozzle to vary the amount of ultraviolet light that is permitted to enter and subsequently exit the nozzle. In yet another preferred embodiment, a cooling coil consisting of one or more conventional cooling elements positioned within the pneumatic chamber for cooling the ambient air. A thermocouple may also be provided to monitor the temperature of the cooled air inside the pneumatic chamber.

BRIEF DESCRIPTION OF THE DRAWINGS

The foregoing and other objects will become more readily apparent by referring to the following detailed description and the accompanying drawings in which:

FIG. 5 is an enlarged schematic diagram of a preferred embodiment of the fuser of the inkjet printer of FIG. 4 for use with an alcohol based ink;

FIG. 6 is an enlarged schematic diagram of an alternative preferred embodiment of the fuser of the inkjet printer of FIG. 4 for use with an alcohol based ink;

FIG. 7 is an enlarged schematic diagram of another alternative preferred embodiment of the fuser of the inkjet printer of FIG. 4 for use with an ultraviolet light based ink;

FIG. 9 is a side elevation view of a third preferred embodiment of an inkjet printer according to the present invention for printing variable identifying information on plain paper label stock, linerless label stock and tape;

FIG. 10 is a top plan view of the inkjet printer of FIG. 9; and

DETAILED DESCRIPTION OF THE PREFERRED EMBODIMENTS

Broadly, the invention is an apparatus for variable image printing on plain paper label stock, linerless label stock and tape. More specifically, the invention is an apparatus for printing variable identifying information, such as product codes, stock or lot numbers, bar codes and shipping data, on plain paper label stock, linerless label stock and tape that is to be applied to the exterior of a case so that the manufacturer, contents or shipping data for each case, or for a series of cases, can be readily identified. In a particular embodiment, the apparatus is combined with a conventional tape applicator to simultaneously seal and label a case on a conventional high-speed production line with adhesive sealing tape from a continuous roll. The apparatus prints the variable identifying information on the face of the tape and the tape applicator simultaneously seals and labels the case with the printed adhesive sealing tape.

The apparatus is an inkjet printer that is adapted to print variable identifying information on plain paper label stock, linerless label stock and tape at a speed greater than about 12 inches per second at a print resolution of at least about 300 dots per inch. Because the print head of the inkjet printer does not apply direct pressure to the face of the label stock or tape, the apparatus permits less expensive linerless label stock and adhesive sealing tape to be used to label, or to simultaneously seal and label a case. The assignee of the present invention has successfully used a thermal transfer printer to print variable identifying information on tape. The operating speed of a thermal transfer printer, however, is currently limited to about 12 inches per second at a resolution of about 300 dots per inch, far below the operating speed of a conventional high-speed production line. A conventional inkjet printer, on the other hand, can operate at speeds up to about 20 inches per second at a resolution of at least about 600 dots per inch. Accordingly, the inkjet printer of the present invention makes it possible to combine the tasks of sealing and labeling a case on a conventional high-speed production line without decreasing productivity or increasing the complexity or the maintenance of the combined sealing and labeling station.

Figure 1:
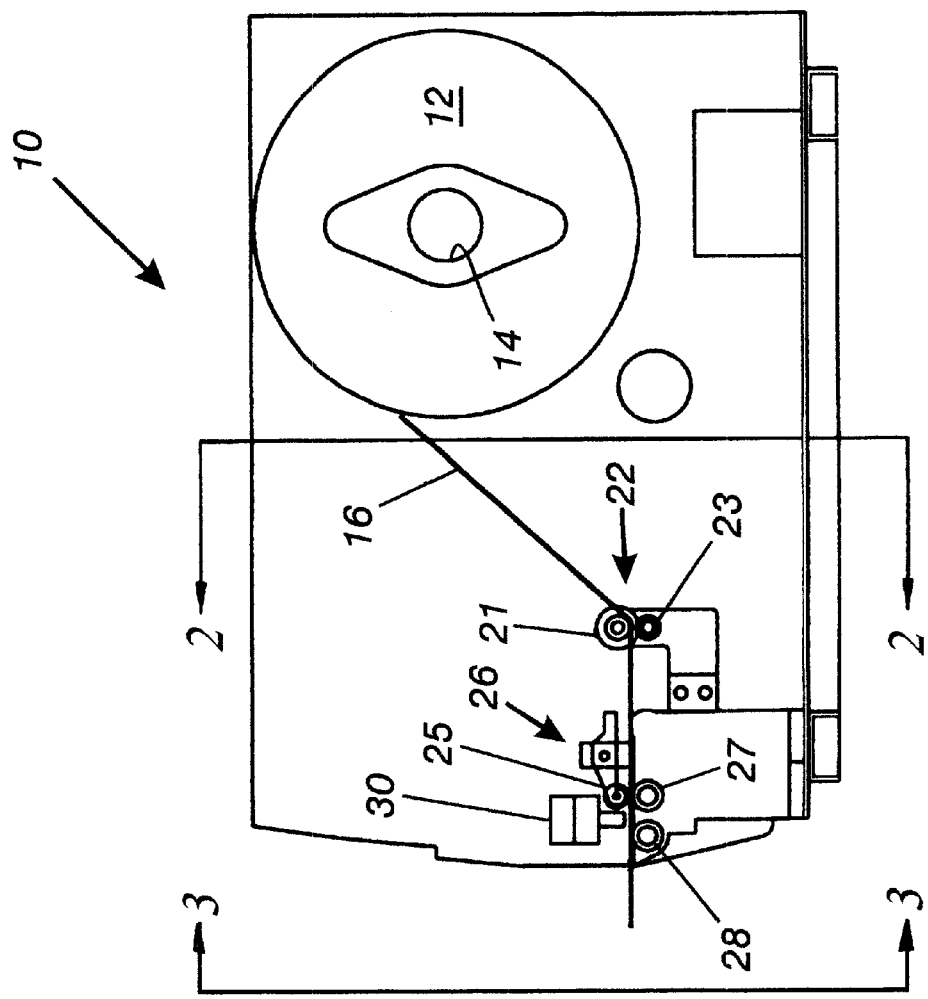
FIG. 1 is a side elevation view of a first preferred embodiment of an inkjet printer according to the present invention for printing variable identifying information on plain paper label stock.
Figure 3:
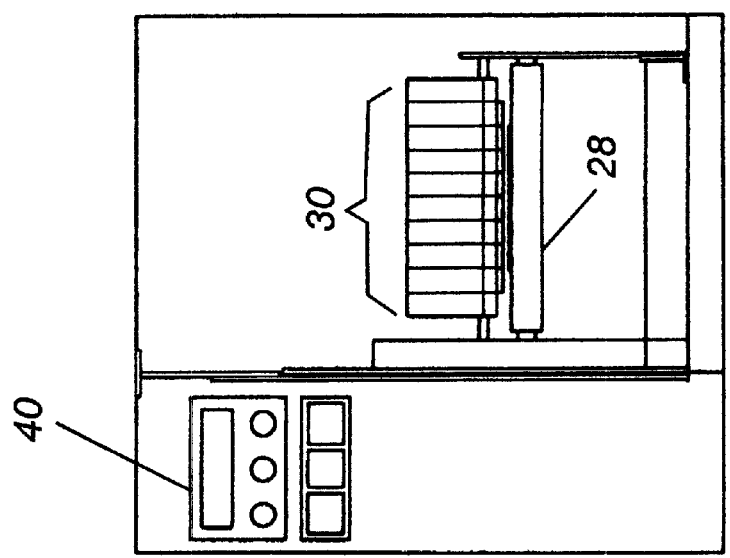
FIG. 3 is an end view of the inkjet printer of FIG. 1 taken in the direction indicated by line 3—3 in FIG. 1.
Figure 2:
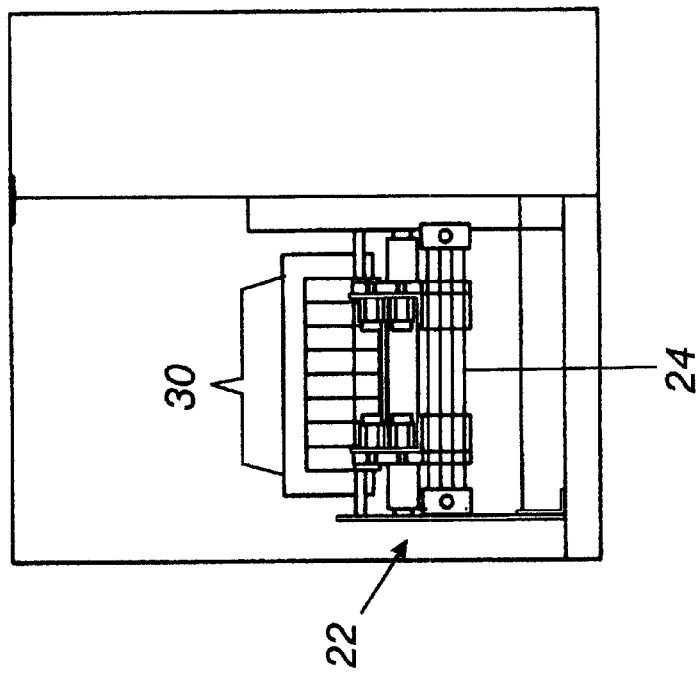
FIG. 2 is a sectional view of the inkjet printer of FIG. 1 taken along line 2—2 in FIG. 1.

In a first preferred embodiment shown in FIGS. 1–3, an inkjet printer, indicated generally at 10, according to the invention includes an unwind spool 12 rotatably mounted on an unwind spool spindle 14. The inkjet printer 10 is suitable for printing on a continuous roll of plain paper label stock 16 as will be described hereinafter. The plain paper label stock 16 is wound onto the unwind spool 12 in a known manner, and the spool rotates freely on the unwind spool spindle 14 so that the continuous roll of plain paper label stock may be unwound from the unwind spool on demand. The plain paper label stock 16 unwound from the unwind spool 12 is routed past at least one inkjet head 30 to, for example, a dispensing arm (not shown) which applies the plain paper label stock to, for example, a case (not shown) in a known manner. A cutting blade (not shown) is also provided to cut the plain paper label stock 16 to the length required for the size of the particular label to be applied to the case. Each inkjet head 30 has a width of approximately ½-inch. Thus, the width of the surface area of the plain paper label stock 16 to be printed with variable identifying information will determine the number of inkjet heads 30 required to variably image print the label.

The inkjet printer 10 comprises a series of guides and rollers for delivering the plain paper label stock 16 to the inkjet head 30 to print the variable identifying information. Preferably, the series of guides and rollers comprises a pair of opposed guide rollers 22, a nip roller assembly 26 and a driven platen roller 28. The opposed guide rollers 22 consist of an upper guide roller 21 and a lower guide roller 23 mounted on a transverse guide roller adjusting rod 24 (FIG. 2). The nip roller assembly 26 consists of a nip roller 25 and a driven feed roller 27 opposite the nip roller. The driven platen roller 28 is positioned opposite the inkjet head 30 adjacent the discharge end of the inkjet printer 10. The plain paper label stock 16 unwound from the unwind spool 12 is routed between the upper guide roller 21 and the lower guide roller 23 of the opposed guide rollers 22 to the nip roller assembly 26. There, the nip roller 25 applies pressure to the face of the plain paper label stock 16 against the feed roller 27. The feed roller 27 and the platen roller 28 are mechanically connected to a direct current (DC) servo motor, such as a stepper drive motor, which simultaneously drives the feed roller 27 and the platen roller 28 to advance the plain paper label stock 16 past the inkjet head 30 of the inkjet printer 10.

Preferably, the inkjet printer 10 is further provided with an operator control panel 40 (FIG. 3) and associated microprocessor (not shown). The operator control panel 40 is utilized to electronically input operating parameters and data to the microprocessor to control the operation of the inkjet printer 10. The variable identifying information may be electronically input directly to the microprocessor or to a central processor in electrical communication with the inkjet head 30 of the inkjet printer 10. The variable identifying information may be stored in memory for selective transmission to the inkjet head 30, or may be input by an operator from a conventional keyboard in real time in a known manner.

The first preferred embodiment of the inkjet printer 10 shown in FIGS. 1–3 is suitable for variable image printing on plain paper label stock, but is not entirely suitable for variable image printing on linerless label stock or tape, such as adhesive sealing tape. Linerless label stock and tape have a first side, or face, that is coated with a release agent and a second side opposite the first side that is coated with an activated chemical adhesive. The release agent is provided to permit the linerless label stock or tape to be unwound from the continuous roll without the activated chemical adhesive sticking to the face of the linerless label stock or tape on the roll. The commonly available inks for conventional inkjet printers do not dry rapidly enough to adhere the print to the release agent or to the substrate, typically acetate, under the release agent. Accordingly, the ink may smear, blur or rub off as the linerless label stock or tape is applied, or under normal handling and shipping conditions.

Figure 4:
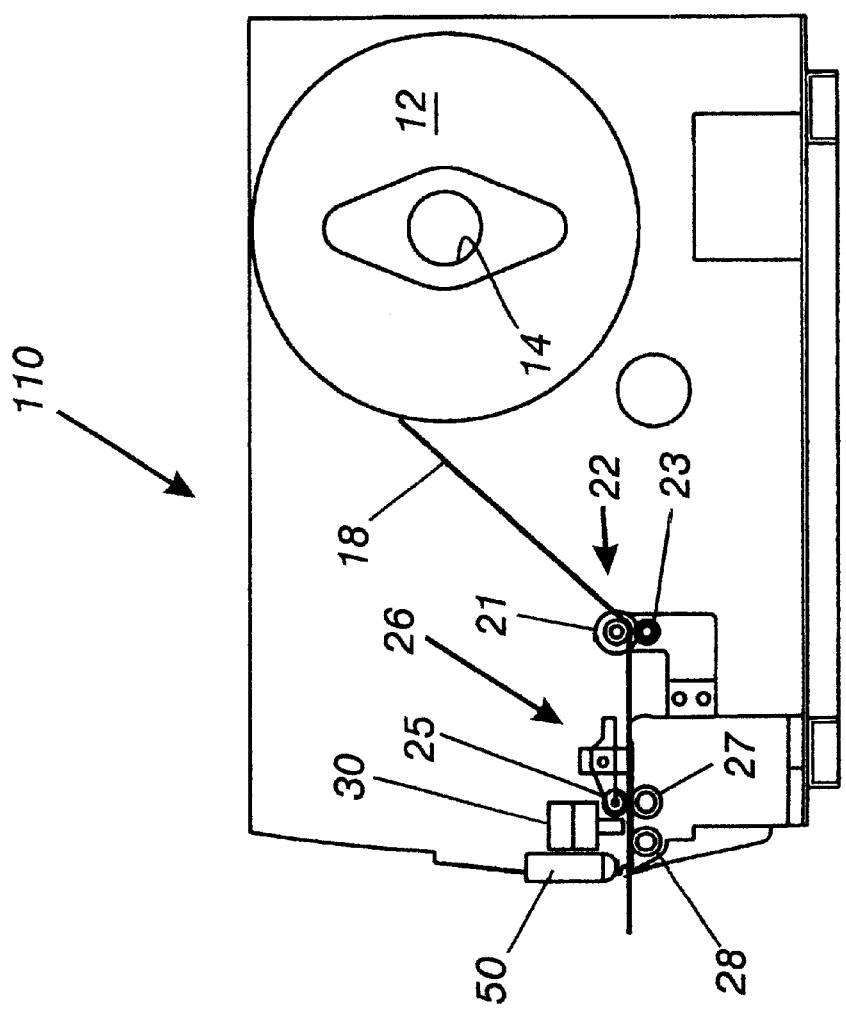
FIG. 4 is a side elevation view of a second preferred embodiment of an inkjet printer according to the present invention for printing variable identifying information on plain paper label stock, linerless label stock and tape.

A second preferred embodiment of an inkjet printer, indicated generally at 110, according to the invention is shown in FIG. 4. The inkjet printer 110 is particularly well suited for printing variable identifying information on linerless label stock and tape 18. The inkjet printer 110 is provided with specially formulated ink that is melted and then forced through the inkjet head 30 under pressure. The ink is melted and applied under pressure so that the ink adheres to the release agent on the face of the linerless label stock or tape 18. The ink is specially formulated to bond to the release agent so that the printed information does not smear, blur or rub off as the linerless label stock or tape 18 is applied, or under normal handling and shipping conditions. In particular, the ink has a specific formulation that is compatible with the physical and chemical characteristics of the release agent. Preferably, the ink and the release agent are co-engineered to optimize the adherence, bleed resistance, visibility, flexibility and utility requirements for printing the variable identifying information on the face of the linerless label stock or tape 18. In addition, the inkjet printer 110 comprises a fuser 50 for drying the specially formulated ink immediately after the variable identifying information is printed on the face of the linerless label stock or tape 18.

Most preferably, however, the ink is a combination of wax and resin similar to the ink that is embossed on a thermal transfer ribbon for use with a thermal transfer printer to variable image print on linerless label stock and tape as disclosed in U.S. patent application Ser. No. 08/956,729 and U.S. patent application Ser. No. 09/124,705, the disclosures of which are incorporated herein by reference. The resin is specially engineered to print on the face of the linerless label stock or tape and the wax is specially engineered to adhere the print to the release agent or the underlying substrate. The wax may, for example, be beeswax or a cannola based wax. It has been empirically determined that a resin/wax based ink developed for use in the dry cleaning industry to print on chemically treated fabric is particularly well suited for printing variable identifying information on linerless label stock and tape 18 as described herein. However, any ink that prints on the face of the linerless label stock or tape 18 and adheres the print to the release agent or the underlying substrate is sufficient.

In the second preferred embodiment shown in FIG. 4, the lower guide roller 23, the feed roller 27 and the driven platen roller 28 are specially designed to support the adhesive side of the linerless label stock or tape 18 while maintaining consistent alignment of the print surface area opposite the inkjet head 30. In particular, the lower guide roller 23 is adjustably mounted on the guide roller adjusting rod 24 to accurately position the linerless label stock or tape 18 relative to the print head 30. The feed roller 27 and the driven platen roller 28 are mounted on elongate tension arms connected at the opposite end to the drive shaft of the servo motor. Together, the opposed guide rollers 22 and the nip roller assembly 26 tension the linerless label stock or tape 18 while the lower guide roller 23, the feed roller 27 and the driven platen roller 28 support the adhesive side of the linerless label stock or tape 18 opposite the inkjet head 30. Preferably, the lower guide roller 23, the feed roller 27 and the driven platen roller 28 have an exterior coating that prevents the activated chemical adhesive on the linerless label stock or tape 18 from accumulating on the exterior surfaces of the rollers. Because the rollers are not merely coated with a release film, the activated chemical adhesive does not collect any release film from the rollers, thereby preventing the adhesive from adequately adhering the linerless label stock or tape to the case. Likewise, the coating on the rollers does not collect any activated chemical adhesive from the linerless label stock or tape 18, thereby preventing the adhesive from adequately adhering the linerless label stock or tape to the case.

FIG. 5 illustrates a preferred embodiment of the fuser 50 of the inkjet printer 110 for use with an alcohol based ink. The fuser 50 comprises a blower unit 52 in fluid communication with a pneumatic chamber 54, a butterfly valve 56 and a nozzle 58 having a truncated, conical entrance port 57 and a small diameter, cylindrical exit port 59. The blower unit 52 generates an air stream of ambient air that is directed to the pneumatic chamber 54 through an exhaust port 53. The butterfly valve 56 is positioned between the pneumatic chamber 54 and the entrance port 57 of the nozzle 58 to vary the amount of ambient air that is permitted to enter and subsequently exit the nozzle 58 adjacent the face of the linerless label stock or tape 18. The exit port 59 directs the ambient air onto the surface area of the linerless label stock or tape 18 that is printed with the variable identifying information to rapidly dry the ink.

FIG. 6 illustrates an alternative preferred embodiment of a fuser 60 of the inkjet printer 110 for use with an alcohol based ink. The fuser 60 further comprises a heating coil 62 consisting of one or more conventional heating elements. The heating coil 62 heats the ambient air inside the pneumatic chamber 54 generated by the blower unit 52. The fuser 60 further comprises a thermocouple 64 for monitoring the temperature of the heated air inside the pneumatic chamber 54. Preferably, the thermocouple records the temperature of the heated air immediately adjacent the entrance port 57 of the nozzle 58. The butterfly valve 56 is adjusted to vary the flow rate of the heated air to the nozzle 58. Accordingly, the alcohol based ink dries more rapidly on the face of the linerless label stock or tape 18. As a result, the injet printer 110 can be used at operating speeds approaching the operating speed of a conventional high-speed production line.

FIG. 7 illustrates an alternative preferred embodiment of a fuser 70 of the inkjet printer 110 for use with an ultraviolet light based ink. The fuser 70 further comprises at least one ultraviolet light bulb 72 and the butterfly valve 56 of the fuser 60 is replaced by one or more light shutters 74. The ultraviolet light bulb 72 produces ultraviolet light in the pneumatic chamber 54. The light shutter 74 opens to permit the ultraviolet light to enter and subsequently exit the nozzle 58 adjacent the face of the linerless label stock or tape 18. Accordingly, the ultraviolet light based ink dries more rapidly on the face of the linerless label stock or tape 18. As a result, the inkjet printer 110 can be used at operating speeds approaching the operating speed of a conventional high-speed production line.

Figure 8:
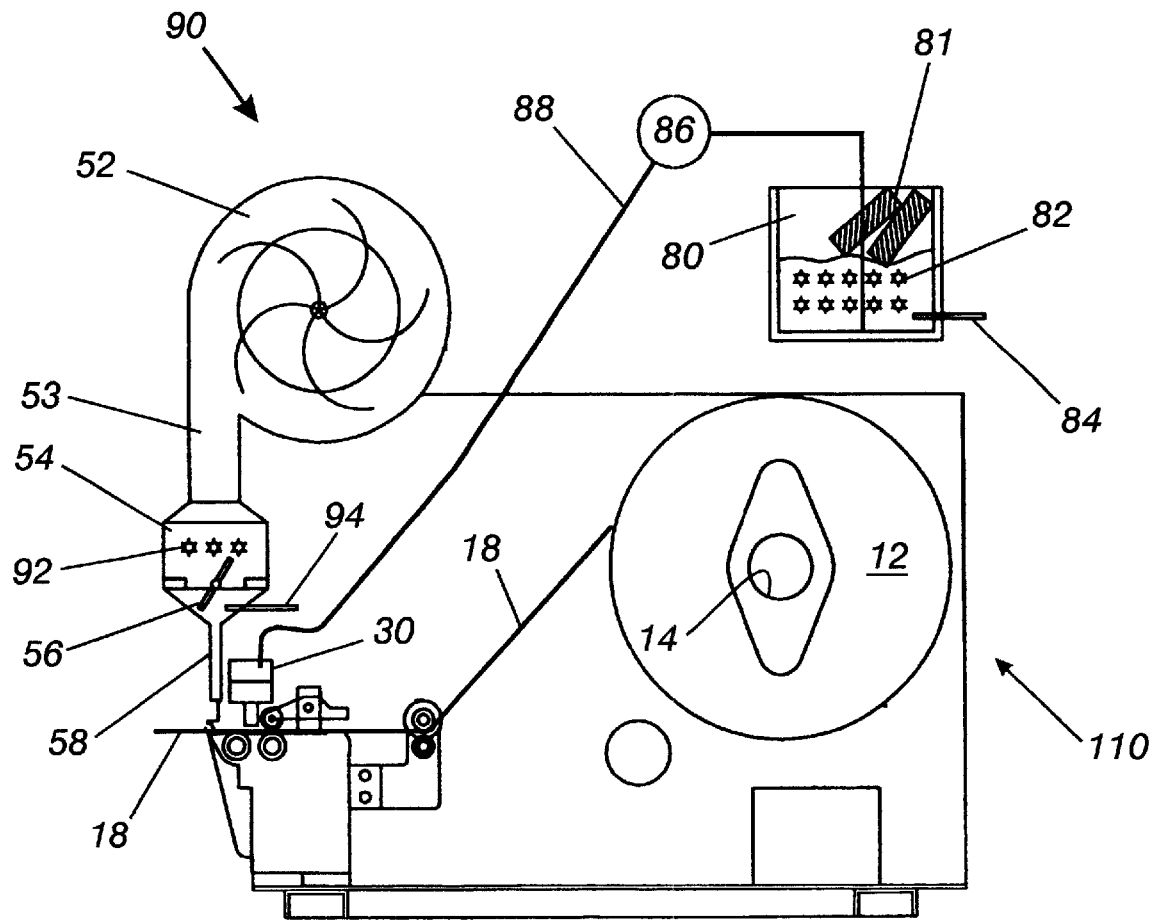
FIG. 8 is a side elevation view of the inkjet printer of FIG. 4 including an enlarged schematic diagram of a preferred embodiment of a fuser for use with a resin/wax based ink system.

FIG. 8 illustrates an alternative preferred embodiment of the inkjet printer 110 of FIG. 4 configured to print variable identifying information on linerless label stock and tape 18 with a resin/wax based ink. The inkjet printer 110 further comprises a melt tank 80, an ink pump 86 in fluid communication with the melt tank and a heated ink conduit 88 for transporting the melted resin/wax based ink to the inkjet head 30. The melt tank 80 preferably comprises a heating coil 82 consisting of one or more conventional heating elements and a thermocouple 84 for monitoring the temperature of the melted resin/wax based ink in the melt tank. One or more resin/wax cubes 81 are placed in the melt tank 80 and the heating coil 82 is activated to melt the cubes into a liquid resin/wax based ink. The pump 86 draws the melted liquid resin/wax based ink from the melt tank 80 through the heated ink conduit 88 to the inkjet head 30 where it is applied to the face of the linerless label stock or tape 18. The conduit 88 heats the resin/wax based ink so that the ink prints on and readily adheres to the release agent, typically silicon, on the face of the linerless label stock or tape 18.

The fuser 90 comprises a cooling coil 92, consisting of one or more conventional cooling elements in place of the heating coil 62, and a thermocouple 94 in place of the thermocouple 64 of the fuser 60, as previously described. Preferably, the cooling coil 92 is filled with a refrigerant, such as R19 Freon, to cool the ambient air inside the pneumatic chamber 54 generated by the blower unit 52. The thermocouple 94 monitors the temperature of the cooled air inside the pneumatic chamber 54 and the butterfly valve 56 is adjusted to vary the flow rate of the cooled air through the nozzle 58. Accordingly, the resin/wax based ink dries more rapidly on the face of the linerless label stock or tape 18. As a result, the inkjet printer 110 can be used at operating speeds approaching the operating speed of a conventional high-speed production line.

A third preferred embodiment of an inkjet printer, indicated generally at 210, according to the invention is shown in FIGS. 9 and 10. The inkjet printer 210 is a compact version of the inkjet printer 110 illustrated in FIG. 4. Accordingly, the inkjet printer 210 is particularly well suited for printing variable identifying information on linerless label stock and tape 18 in a small manufacturing plant or assembly shop. The inkjet printer 210 can also be utilized to variably image print on plain paper label stock 16 by merely deactivating the fuser 250. As shown in FIG. 10, variable identifying information 20 may be printed by inkjet head 30 onto plain paper label stock 16 consisting of labels 17 of varying lengths supported on a continuous roll of a liner coated with a release film. When the inkjet printer 210 is utilized to print variable identifying information on plain paper label stock 16, a continuity, or gap, sensor 15 is provided for sensing the gap between successive labels 17 on the continuous roll. Accordingly, a microprocessor (not shown) can determine the predetermined length of the label 17 and the style of font and pitch required so that the variable identifying information is printed within the available surface area on the face of the label.

In a particular application, the inkjet printer 10 or 110 is coupled with a conventional case sealer to provide a combined sealing and labeling station along a conveyor on a conventional high-speed production line. The inkjet printer 10 or 110 prints the variable identifying information on the face of the linerless label stock or tape 18 and the adhesive side of the linerless label stock or tape 18 is applied to the exterior surface of the case to simultaneously label and seal the case. Preferably, the case is centered on the conveyor (not shown) beneath the tape dispensing arm (not shown) as the case reaches the sealing and labeling station by a pair of centering guides (not shown). The operator control panel 40 may be used to input certain sealing parameters, such as the length of the tape needed to seal the case, to the microprocessor (not shown). Alternatively, the sealing parameters may be electronically transmitted to the tape dispensing arm or the tape dispensing arm may be mechanically adjusted for the length of a particular case.

Figure 11:
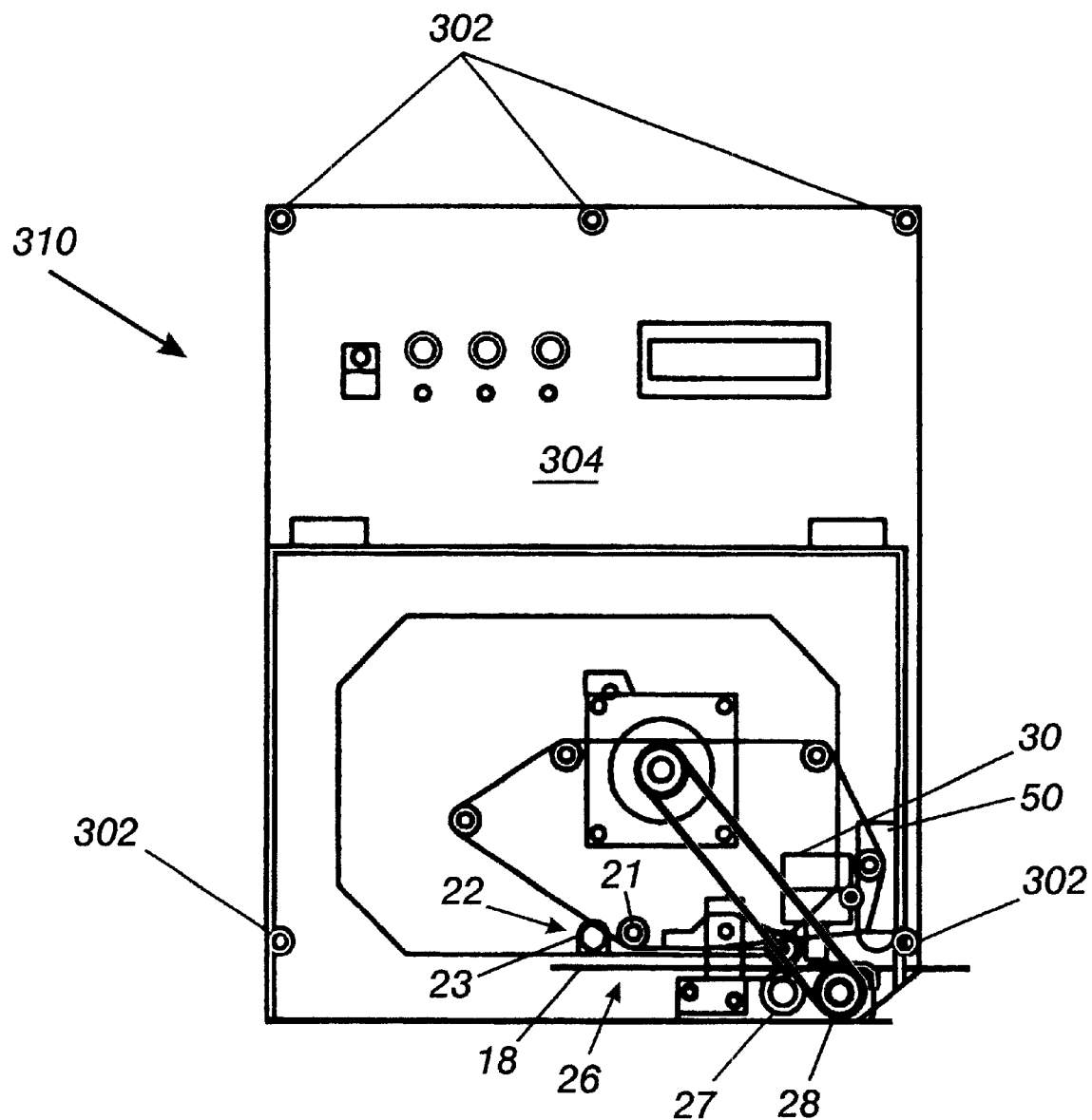
FIG. 11 is a side elevation view of a fourth preferred embodiment of an inkjet printer according to the present invention for printing variable identifying information on plain paper label stock, linerless label stock and tape.

A fourth preferred embodiment of an inkjet printer, indicated generally at 310, according to the invention is shown in FIG. 11. The inkjet printer 310 is adapted to cooperate with an existing sealing and labeling station along a conveyor on a conventional high-speed production line to simultaneously seal and label a case with adhesive sealing tape 18. In particular, the inkjet printer 310 is provided with an industry standard pattern of holes 302 that receive mechanical fasteners to secure the inkjet printer 310 to the tape applicator 304 at the combined sealing and labeling station. The tape dispensing arm (not shown) of the tape applicator 304 receives the adhesive sealing tape 18 from the platen roller 28 of the inkjet printer 310 in a known manner. The distance between the opposed guide rollers 22 on the guide roller adjusting rod 24 is adjusted to the width of the adhesive sealing tape 18 and the tape 18 is routed between the opposed guide rollers 22 to the nip roller assembly 26. The adhesive sealing tape 18 is then driven by the feed roller 27 and the driven platen roller 28 with the face of the tape 18 opposite the inkjet head 30 and the adhesive side of the tape 18 against the driven platen roller 28. Upon receiving a print command, melted ink is forced through the inkjet head 30 under pressure onto the face of the adhesive sealing tape 18 so that the variable identifying information is printed on the face of the tape. The adhesive sealing tape 18 is then routed under tension by external tape guides (not shown) to the tape dispensing arm where it is applied to the case and cut in a known manner.

The inkjet printer 310 may further include a controller (not shown) for rapid and automatic adjustment of the sealing and labeling parameters. Preferably, the controller is located on the housing (not shown) of the inkjet printer 310 and includes a programmable memory for storing a predetermined set of sealing and labeling parameters. Preferably, the operator inputs the sealing and labeling parameters from an operator control panel (not shown) similar to the operator interface for a conventional computer numerically controlled (CNC) machine. The operator control panel may, for example, be a conventional keyboard that permits the operator to manually type the necessary sealing and labeling parameters. Alternatively, the operator control panel may be a conventional mouse driver that permits the operator to select a desired set of sealing and labeling parameters from a menu of predetermined parameters. The sealing and labeling parameters may, for example, include the variable identifying information to be printed on the tape, the desired size and resolution of the print, the speed of the tape, the amount of leader (ie., blank tape) desired between each segment of variable image printing, the proper amount of tension to be maintained on the tape and the interval, if any, between repetitions of the variable identifying information. If applicable, the sealing and labeling parameters may also include the speed of the conveyor on the production line, the length of the case to be sealed and the length of the tape required to seal the case.

It should now be readily apparent that the present invention provides an inkjet printer for printing variable identifying information on plain paper label stock, linerless label stock and tape that is to be applied to a case. It should be further apparent that the present invention provides an inkjet printer for printing variable identifying information on plain paper label stock, linerless label stock and tape at a speed greater than about 12 inches per second at a print resolution of at least about 300 dots per inch. It should be further apparent that a particular application of the present invention provides a combined sealing and labeling station including an inkjet printer for sealing and labeling a case on a conventional high-speed production line with adhesive sealing tape having variable identifying information printed thereon without decreasing productivity or increasing the complexity and maintenance of the station. It should be still further apparent that the present invention provides a combined sealing and labeling station including an inkjet printer for sealing and labeling a case on a conventional high-speed production line that is capable of printing variable identifying information on the face of adhesive sealing tape at a speed greater than about 12 inches per second at a print resolution of at least about 300 dots per inch.

Obviously, many alternative embodiments and modifications of the invention are within the level of ordinary skill of those accomplished in the art of variable image printing. Thus, it is to be understood that the invention is not intended to be limited to the preceding description or by the preferred embodiments illustrated in the accompanying drawings, but rather is intended to encompass all embodiments that may be devised within the spirit and scope of the invention disclosed herein.

That which is claimed is:

1. An apparatus for printing variable identifying information on a substrate, the substrate comprising a first side having a release agent thereon and a second side having an activated chemical adhesive thereon without a liner, said apparatus comprising
   at least one inkjet head for transferring an ink onto the first side of the substrate;
   means for advancing the substrate past said at least one inkjet head; and
   a fuser for drying the ink transferred onto the first side of the substrate, said fuser comprising
      a pneumatic chamber;
      a blower unit for generating a stream of ambient air, said blower unit in fluid communication with said pneumatic chamber;
      a nozzle having an entrance port for receiving the stream of ambient air and an exit port for directing the stream of ambient air onto the first side of the substrate;
      a heating coil positioned within said pneumatic chamber for heating the ambient air in said pneumatic chamber; and
      a thermocouple positioned within said pneumatic chamber for monitoring the temperature of the heated air in said pneumatic chamber.

2. An apparatus for printing variable identifying information on a substrate according to claim 1 wherein said means for advancing comprises
   a pair of opposed guide rollers comprising an upper guide roller and a lower guide roller;
   a nip roller assembly comprising
      a driven feed roller; and
      a stationary nip roller opposite said driven feed roller; and
   a driven platen roller opposite said at least one inkjet head.

3. An apparatus for printing variable identifying information on a substrate according to claim 2 wherein said means for advancing further comprises
   an unwind spool spindle; and
   an unwind spool for supporting a continuous roll of the substrate thereon, said unwind spool rotatably mounted onto said unwind spool spindle so that the substrate is unwound from said unwind spool;
   wherein the continuous roll of the substrate is unwound from said unwind spool and routed between said opposed guide rollers, over said driven feed roller and onto said driven platen roller.

4. An apparatus for printing variable identifying information on a substrate according to claim 1 further comprising a tape applicator that receives the substrate from said at least one inkjet head and applies the second side of the substrate to a case.

5. An apparatus for printing variable identifying information on a substrate, the substrate comprising a first side having a release agent thereon and a second side having an activated chemical adhesive thereon without a liner, said apparatus comprising
    at least one inkjet head for transferring an ink onto the first side of the substrate;
    means for advancing the substrate past said at least one inkjet head; and
    a fuser for drying the ink transferred onto the first side of the substrate, said fuser comprising
        a pneumatic chamber;
        a blower unit for generating a stream of ambient air, said blower unit in fluid communication with said pneumatic chamber;
        an ultraviolet light bulb positioned within said pneumatic chamber; and
        a nozzle having an entrance port for receiving the stream of ambient air and an exit port for directing the stream of ambient air onto the first side of the substrate.

6. An apparatus for printing variable identifying information on a substrate according to claim 5 wherein said means for advancing comprises
    a pair of opposed guide rollers comprising an upper guide roller and a lower guide roller;
    a nip roller assembly comprising
        a driven feed roller; and
        a stationary nip roller opposite said driven feed roller; and
    a driven platen roller opposite said at least one inkjet head.

7. An apparatus for printing variable identifying information on a substrate according to claim 6 wherein said means for advancing further comprises
    an unwind spool spindle; and
    an unwind spool for supporting a continuous roll of the substrate thereon, said unwind spool rotatably mounted onto said unwind spool spindle so that the substrate is unwound from said unwind spool;
    wherein the continuous roll of the substrate is unwound from said unwind spool and routed between said opposed guide rollers, over said driven feed roller and onto said driven platen roller.

8. An apparatus for printing variable identifying information on a substrate according to claim 5 further comprising a tape applicator that receives the substrate from said at least one inkjet head and applies the second side of the substrate to a case.

9. An apparatus for printing variable identifying information on a substrate according to claim 5 further comprising at least one light shutter positioned between said pneumatic chamber and said entrance port of said nozzle, said light shutter comprising a plate that is movable relative to said entrance port of said nozzle to vary the amount of ambient air that is permitted to enter and subsequently exit said nozzle.

10. An apparatus for printing variable identifying information on a substrate according to claim 5 further comprising
    a melt tank for receiving the ink in a solid form;
    a heating coil positioned within said melt tank for melting the ink; and
    means in fluid communication with said melt tank for delivering the melted ink to said at least one inkjet head.

11. An apparatus for printing variable identifying information on a substrate according to claim 10 wherein said means for delivering comprises
    an ink pump in fluid communication with said melt tank; and
    a conduit connecting said melt tank to said at least one inkjet head.

12. An apparatus for printing variable identifying information on a substrate according to claim 10 further comprising a thermocouple for monitoring the temperature of the melted ink in said melt tank.

13. An apparatus for printing variable identifying information on a substrate, the substrate comprising a first side having a release agent thereon and a second side having an activated chemical adhesive thereon without a liner, said apparatus comprising
    at least one inkjet head for transferring an ink onto the first side of the substrate;
    means for advancing the substrate past said at least one inkjet head; and
    a fuser for drying the ink transferred onto the first side of the substrate, said fuser comprising
        a pneumatic chamber;
        a blower unit for generating a stream of ambient air, said blower unit in fluid communication with said pneumatic chamber;
        a nozzle having an entrance port for receiving the stream of ambient air and an exit port for directing the stream of ambient air onto the first side of the substrate; and
        a butterfly valve positioned between said pneumatic chamber and said entrance port of said nozzle, said butterfly valve comprising a plate that is movable relative to said entrance port of said nozzle to vary the amount of ambient air that is permitted to enter and subsequently exit said nozzle.

14. An apparatus for printing variable identifying information on a substrate, the substrate comprising a first side having a release agent thereon and a second side having an activated chemical adhesive thereon without a liner, said apparatus comprising
    at least one inkjet head for transferring an ink onto the first side of the substrate;
    means for advancing the substrate past said at least one inkjet head; and
    a fuser for drying the ink transferred onto the first side of the substrate, said fuser comprising
        a pneumatic chamber;
        a blower unit for generating a stream of ambient air, said blower unit in fluid communication with said pneumatic chamber;
        a nozzle having an entrance port for receiving the stream of ambient air and an exit port for directing the stream of ambient air onto the first side of the substrate;
        a melt tank for receiving the ink in a solid form;
        a heating coil positioned within said melt tank for melting the ink; and
        means in fluid communication with said melt tank for delivering the melted ink to said at least one inkjet head.

15. An apparatus for printing variable identifying information on a substrate according to claim 14 wherein said means for delivering comprises
    an ink pump in fluid communication with said melt tank; and
    a conduit connecting said melt tank to said at least one inkjet head.

16. An apparatus for printing variable identifying information on a substrate according to claim 14 further comprising a thermocouple for monitoring the temperature of the melted ink in said melt tank.

* * * * *